United States Patent

Heen et al.

(10) Patent No.: US 10,165,049 B2
(45) Date of Patent: Dec. 25, 2018

(54) DEVICES AND METHODS FOR PERFORMING TCP HANDSHAKES

(71) Applicant: THOMSON LICENSING, Issy les Moulineaux (FR)

(72) Inventors: Olivier Heen, Domloup (FR); Christoph Neumann, Rennes (FR)

(73) Assignee: InterDigital CE Patent Holdings, Paris (FR)

(*) Notice: Subject to any disclaimer, the term of this patent is extended or adjusted under 35 U.S.C. 154(b) by 283 days.

(21) Appl. No.: 15/048,292

(22) Filed: Feb. 19, 2016

(65) Prior Publication Data

US 2016/0248855 A1 Aug. 25, 2016

(30) Foreign Application Priority Data

Feb. 20, 2015 (EP) ..................... 15305261

(51) Int. Cl.
G06F 15/16 (2006.01)
H04L 29/08 (2006.01)
H04L 29/06 (2006.01)

(52) U.S. Cl.
CPC .......... *H04L 67/1095* (2013.01); *H04L 67/42* (2013.01); *H04L 69/163* (2013.01)

(58) Field of Classification Search
CPC .... H04L 67/1095; H04L 67/42; H04L 69/163
See application file for complete search history.

(56) References Cited

U.S. PATENT DOCUMENTS

| 765,427 A | 7/1904 | Herrick |
| 7,650,427 B1 | 1/2010 | Liu et al. |
| 7,921,282 B1* | 4/2011 | Mukerji ............... H04L 69/163 713/151 |
| 8,069,352 B2* | 11/2011 | Sturges .............. H04L 63/1408 713/178 |
| 8,274,886 B2 | 9/2012 | Gerber et al. |
| 8,433,808 B1* | 4/2013 | Hong .................... H04L 67/02 709/228 |

(Continued)

FOREIGN PATENT DOCUMENTS

| EP | 1622334 | 2/2006 |
| WO | WO 2014/179875 A1 * | 11/2014 ............. H04L 7/00 |
| WO | WO2014179875 | 11/2014 |

OTHER PUBLICATIONS

Gont, F., "Survey of Security Hardening Methods for Transmission Control Protocol (TCP) Implémentations", TCP Maintenance and Minor Extensions Internet Draft, UK CPNI, Mar. 13, 2012, pp. 1-86.

(Continued)

Primary Examiner — Richard G Keehn
(74) Attorney, Agent, or Firm — Joseph J. Opalach

(57) ABSTRACT

A TCP handshake is distributed by having an initiator device send, to a server SYN(m) with the IP address of a terminator device as source address. The initiator device can then forget any TCP state for the SYN(m). The server responds with a SYN-ACK(m+1, n) according to the normal TCP handshake, but the response goes to the terminator device that receives the message, reconstructs the TCP handshake as if it had sent the initial SYN message, and sends an ACK(n+1) to the server. The TCP handshake method can be used to avoid allocation of resources in for example device monitoring.

14 Claims, 2 Drawing Sheets

(56) References Cited

U.S. PATENT DOCUMENTS

| 8,984,635 B1* | 3/2015 | Graham-Cumming ...................... H04L 69/163 726/23 |
| 2011/0255537 A1* | 10/2011 | Ramasamy ........... H04L 69/163 370/392 |
| 2014/0310390 A1* | 10/2014 | Sorenson, III ...... H04L 67/1023 709/223 |

OTHER PUBLICATIONS

Anonymous, "Content delivery network", Wikipedia, http://en.wikipedia.org/w/index.php?title=Content_delivery_network&oldid=625147 . . . , Sep. 11, 2014, pp. 1-8.

Anonymous, "TR-069", Wikipedia, http://en.wikipedia.org/w/index.php?title=TR-069&oldid=626598094 . . . , Sep. 22, 2014, pp. 1-5.

* cited by examiner

DEVICES AND METHODS FOR PERFORMING TCP HANDSHAKES

This application claims the benefit, under 35 U.S.C. § 119 of European Patent Application No. 15305261.8, filed Feb. 20, 2015.

TECHNICAL FIELD

The present disclosure relates generally to computer systems and in particular to performing TCP/IP handshakes in such systems.

BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In the description, the word 'client' can be used to refer to the TCP client, i.e. the device that sends a SYN message and an ACK message, and the word 'server' can be used to refer to the TCP server, i.e. the device that receives the SYN message. It will thus be appreciated that such a 'client' may be a server (such as a web server) in the more ordinary use of the term and that a 'server' may, in a corresponding manner, be a client such as a web client. How these terms are to be interpreted is clear from the context.

TCP/IP is a very well-known communication protocol. To establish a TCP/IP connection between two devices, the devices perform a TCP handshake illustrated in FIG. 1. A first device—called the client—sends a SYN(m) message comprising the IP address of the first device and a first integer m to a second device—called the server. If the server accepts the request, it responds to the received IP address with a SYN-ACK(m+1, n) message that comprises a second integer n and the first integer m incremented by 1, i.e. m+1. After sending the SYN message, the client keeps a record of the sent SYN message and waits for a predetermined time; if it has not received a corresponding SYN-ACK message before the time lapses, it stops waiting. Upon reception of the SYN-ACK message from the server, the client checks that the SYN-ACK message comprises m+1. If this is the case, the acknowledges reception by sending an ACK(n+1) message comprising the second integer n incremented by 1, i.e. n+1, to the server. The server finally verifies that the ACK message comprises n+1. Provided that the server's verification is successful, after this, the handshake has been successfully performed.

In certain situations, such as when the client tries to perform handshakes with a plurality of servers in parallel, it can be problem that the device have to keep resources allocated during the handshake. For each emitted or received SYN, the TCP stack initiates one Transmission Control Block (TCB) record, each requiring several hundreds of bytes. During the 3-way handshake, no a priori assumption is made on the network speed. Consequently, TCB records possibly survive for a long time, consuming resources. Even worse, when sending SYNs to devices that are not connected or do not respond the TCP stack maintains the corresponding TCBs for some time (the timeout duration), thus wasting resources.

It will be appreciated that it is desired to have a solution that overcomes at least part of the problems related to the TCP handshake. The present disclosure provides such a solution.

SUMMARY OF DISCLOSURE

In a first aspect, the present principles are directed to a device for performing a TCP handshake. The device comprises an interface configured to transmit messages between at least one external device and a processor in the device; and a processor configured to receive from the interface a SYN-ACK message for which the device has not sent a corresponding SYN message, the SYN-ACK message comprising a source address, generate an ACK message corresponding to the SYN-ACK message, and send the ACK message to the interface for transmission to the source address.

Various embodiments of the first aspect include:
  That the processor is configured to access to a TCP stack storing records of transmitted SYN messages and to reconstruct the TCP handshake as if the device had sent the corresponding SYN message by patching the TCP stack as if the device had sent the corresponding SYN message and by creating a record corresponding to the corresponding SYN message. It is advantageous that each record comprises a sequence number of the SYN message and that the processor is further configured to obtain the sequence number for the corresponding SYN message by subtracting one from a corresponding integer in the SYN-ACK message.
  That the device further comprises a firewall configured to intercept the SYN-ACK message and inform the processor of the interception, that the processor is further configured to generate the corresponding SYN message that is sent towards the source address and to update a TCP stack, and that the firewall is further configured to intercept the corresponding SYN message generated by the processor and only then forward the SYN-ACK message to the processor.
  That the processor is further configured to send a request for data to a server, the request comprising a first integer, receive data from the server, and verify, using the first integer and a second integer received with the SYN-ACK message, that the SYN-ACK message is related to the request.

In a second aspect, the present principles are directed to a method for performing a TCP handshake. A processor of a device receives a SYN-ACK message for which the device has not sent a corresponding SYN message, the SYN-ACK message comprising a source address, and generates and sends an ACK message corresponding to the SYN-ACK message to the source address.

Various embodiments of the first aspect include:
  That the method further comprises accessing to a TCP stack storing records of transmitted SYN messages and reconstructing the TCP handshake as if the device had sent the corresponding SYN message by patching the TCP stack as if the device had sent the corresponding SYN message and by creating a record corresponding to the corresponding SYN message. It is advantageous that each record comprises a sequence number of the SYN message and that the processor is further configured to obtain the sequence number for the corresponding SYN message by subtracting one from a corresponding integer in the SYN-ACK message.

That the device further comprises a firewall configured to intercept the SYN-ACK message and inform the processor of the interception, that the processor is further configured to generate the corresponding SYN message that is sent towards the source address and to update a TCP stack, and that the firewall is further configured to intercept the corresponding SYN message generated by the processor and only then forward the SYN-ACK message to the processor.

That the processor is further configured to send a request for data to a server, the request comprising a first integer, receive data from the server, and verify, using the first integer and a second integer received with the SYN-ACK message, that the SYN-ACK message is related to the request.

In a third aspect, the present principles are directed to a server comprising a processor configured to receive a request for data from a client, the data comprising a first part and a second part, and the request comprising an address of the client, send the first part to the client, and send a SYN message of a TCP handshake to a further device configured to provide the second part to the client, the SYN message comprising the address of the client as source address.

An embodiment of the third aspect comprises that the request comprises an integer and that the processor is further configured to send the integer to the further device with the SYN message.

In a fourth aspect, the present principles are directed to a method comprising, at a processor of a server, receiving a request for data from a client, the data comprising a first part and a second part, and the request comprising an address of the client, sending the first part to the client, and sending a SYN message of a TCP handshake to a further device configured to provide the second part to the client, the SYN message comprising the address of the client as source address.

An embodiment of the fourth aspect comprises that the request comprises an integer and wherein the processor further sends the integer to the further device with the SYN message.

In a fifth aspect, the present principles are directed to a non-transitory storage medium storing instructions that, when executed by a processor, perform the method of the second aspect.

BRIEF DESCRIPTION OF DRAWINGS

Preferred features of the present principles will now be described, by way of non-limiting example, with reference to the accompanying drawings, in which.

DESCRIPTION OF EMBODIMENTS

Figure 1:
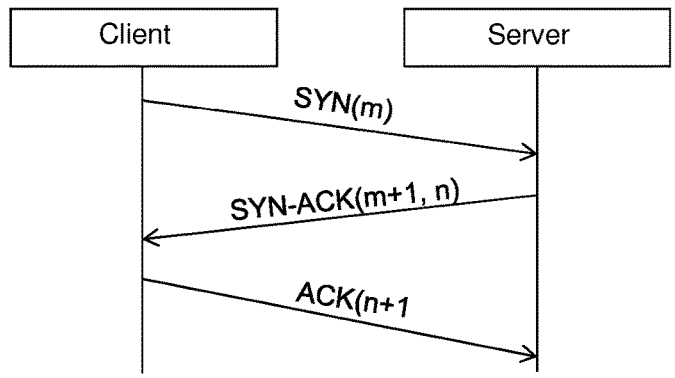
FIG. 1 illustrates a TCP handshake according to the prior art.
Figure 2:
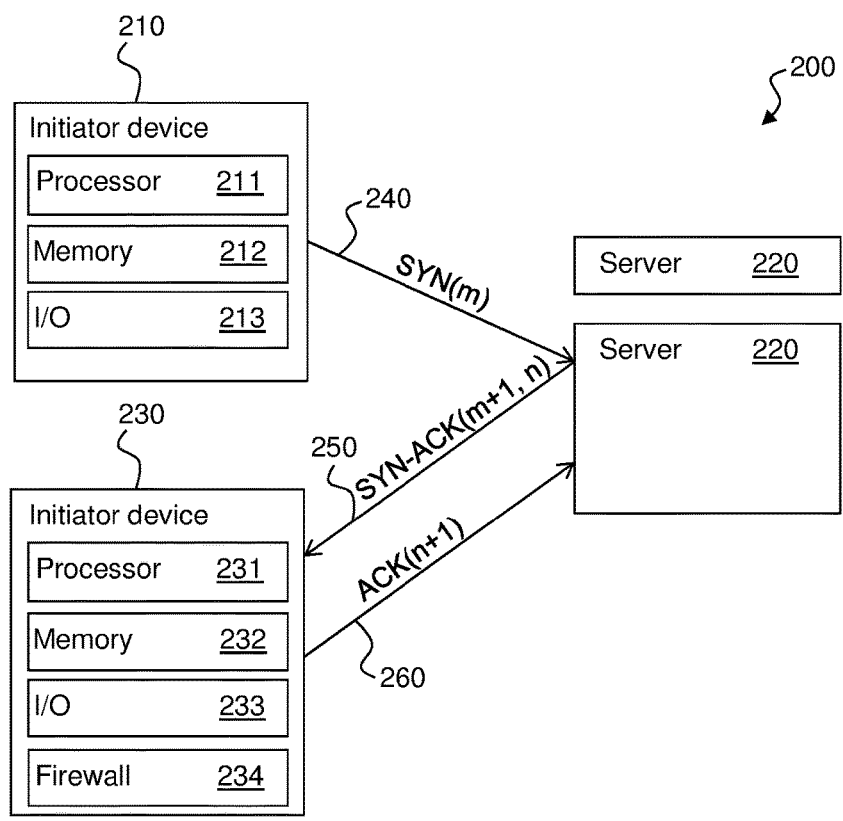
FIG. 2 illustrates a system implementing the present principles.

FIG. 2 illustrates a system 200 implementing the present principles. The system 200 comprises an initiator device 210, at least one server device 220 and at least one terminator device 230. Although only illustrated for some of the devices, each of these devices 210, 220, 230 comprises at least one hardware processing unit ("processor") 211, 231, memory 212, 232 and at least one communications interface (I/O) 213, 233 configured to communicate messages with other devices to and from the processor. The terminator device 230 can also comprise a firewall 234, possibly implemented in the processor 231 or in a separate processor (not shown). The skilled person will appreciate that the illustrated devices are very simplified for reasons of clarity and that real devices in addition would comprise features such as internal connections and power supplies. The processors are configured to execute instructions (possibly at least partly stored in the memory) in order to handle messages, perform calculations and so on, as described. A non-transitory storage medium (not shown) stores instructions that, when executed by a processor, perform the TCP handshake method at the terminator device described hereinafter.

To perform the TCP handshake, the initiator device 210 begins by sending a SYN(m) message 240 to a server 220. The SYN message comprises a first integer m and, different from the standard prior art handshake, the IP address of a terminator device. After this, the initiator device 210 can forget all about the sent SYN message 240; it is pointless for the initiator device 210 to store a TCB since it will not receive any corresponding SYN-ACK message. In one embodiment, particularly suited for e.g. monitoring of many server devices, the initiator device 210 can select the source address among the network addresses of the terminator devices in order to provide load balancing between the terminator devices; it is then advantageous for the terminator devices to provide feedback on their respective loads to the initiator device.

The server 220 reacts like a prior art server, i.e. by responding with a corresponding SYN-ACK(m+1, n) message 250 comprising m+1 and a second integer n. It is to be noted that the server 220 sends the response to the source IP address of the SYN message 240 since the server 220 believes that this is the IP address of the sender of the SYN message 240.

The terminator device 230 that receives the SYN-ACK message does not store a corresponding TCB, which means that the SYN-ACK message is its first contact with the TCP handshake. The terminator device 230 thus needs to reconstruct the TCP handshake, just as if it had sent the original SYN message 240. This can be done in various ways of which two examples will be given.

A first way is to patch its TCP stack by setting its TCP state-machine to ESTABLISHED and by reconstructing the TCB using the sequence number that corresponds to the first integer m. The sequence number is easily calculated by subtracting one from the incremented integer received in the SYN-ACK message 250, i.e. by calculating (m+1)−1. Generally, the TCP stack also keeps the timestamp of the SYN message 240; this timestamp may be reconstructed using a time prior to the time of reception of the SYN-ACK message 250. An advantage of this way is that it is lightweight, but it may on the other hand be complex to patch the TCP code.

A second way is to use a firewall 234 on the terminator device 230 to intercept the SYN-ACK message 250 and informs a function in the terminator device 230 of the reception. The function generates a corresponding SYN(m) message that is sent towards the server 220, but which also is intercepted by the firewall that only then forwards the SYN-ACK message 250 to the TCP stack. An advantage of this way is that the TCP stack is not modified, but it requires additional resources such as the firewall and the function.

The TCP stack can be stored in the processor if it has enough resources to do this or in the memory, or in a combination thereof. In either case, the processor has access to the TCP stack.

The terminator device 230 then sends a SYN(n+1) message 260 to the server 220 and the handshake is then terminated.

Figure 3:
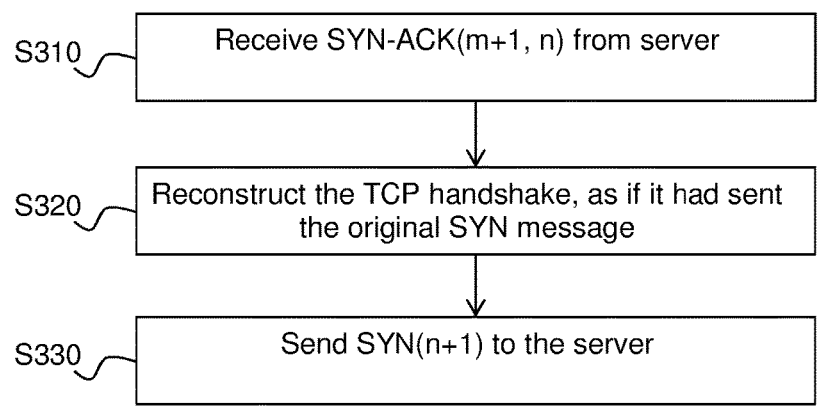
FIG. 3 illustrates a method for performing a TCP handshake at a device according to the present principles.

FIG. 3 illustrates a method for performing a TCP handshake at a terminator device according to the present principles. The terminator device 230 does not store any TCB for the upcoming TCP handshake; in other words, it did not send the initial SYN message and may even be unaware that such a message was sent.

In step S310, the communications interface of the terminator device receives a SYN-ACK(m+1, n) message from a server. In step S320, the terminator device reconstructs the TCP handshake, just as if it had sent the original SYN message, using for example one of the two ways described hereinbefore. The terminator device then sends, in step S330, a SYN(n+1) message to the server and the handshake is then terminated.

The present principles may be used when remote monitoring devices such as gateways or mobile phones. The prior art solutions for such monitoring encountered problems mainly because of the great number of devices—hundreds of thousands or even millions—to be monitored since resources are allocated in the monitoring servers for each device to which a SYN message is sent. The main prior art solution is horizontal scaling, i.e. adding monitoring servers as a function of the number of devices to be monitored. The cost of scaling is at best linear, but extra infrastructure is usually needed.

It will be appreciated that the present principles at least in part can overcome this problem. The initiator device does not keep any states and does not store any TCBs, which means that it does not have to allocate resources for each device to be monitored (apart from the resources needed to send the SYN messages). The monitored devices behave in the prior art manner, as already explained. Finally, the terminator devices (in this case normally more than one) only need to allocate resources to the monitored devices upon reception of SYN-ACK messages. There is thus no need allocate resources for devices that do not respond for one reason or another.

The present principles may also be used when a client such as a web browser requests a web page that comprises information provided by different providers. A prime example of such a web page is the front page of an online newspaper comprising, apart from the news articles provided by the newspaper itself, advertisements provided by different advertisement providers.

It will be appreciated that the present principles can be used in this case too. When the client requests the web page from the server, the server can take the role of the initiator device and send SYN messages to the third party servers that provide tracking, advertisements, caching, embedded content, etc. for the requested web page. The server spoofs the source address of these SYN messages so that they appear to originate from the client. The third party servers behave according to the normal TCP handshake, i.e. they 'respond' with SYN-ACK messages that are sent to the client. Upon reception of the SYN-ACK messages, the client then acts like a terminator device, i.e. it reconstructs the TCP connection and sends SYN messages to the third party servers.

It is advantageous to use feature similar to SYN-cookies: the client's request comprises an integer that is forwarded by the server to the third party servers for inclusion in the SYN-ACK messages that are sent to the client. This way, the client can verify that the received SYN-ACK messages are related to the request for the web page. The third-party servers may include the integer as it is, but may also process the integer before inclusion by, for example, incrementing the integer (as is done with the integer in the SYN message)—in any case, the received integer allows verification that the SYN-ACK message is related to the request.

An advantage of this is that the connection can be sped up since the connections between the client and the third party servers can be quicker—there is no need for the client to wait for information about the third party servers in the web page as the server initiates the TCP handshakes. It is advantageous that the client informs the server, for example in its request, that it is capable of handling a modified TCP handshake since a device that it not capable of doing this would simply reject the SYN-ACK messages from the third party servers.

It will thus be appreciated that the present principles provide a TCP handshake that, at least in certain cases, can improve on the prior art TCP handshake.

Each feature disclosed in the description and (where appropriate) the claims and drawings may be provided independently or in any appropriate combination. Features described as being implemented in hardware may also be implemented in software, and vice versa. Reference numerals appearing in the claims are by way of illustration only and shall have no limiting effect on the scope of the claims.

The invention claimed is:

1. A device for performing a TCP handshake, the device comprising:
    an interface configured to transmit messages between at least one external device and a processor in the device; and
    a processor configured to:
        receive from the interface a SYN-ACK message for which the device has not sent a corresponding SYN message, the SYN-ACK message comprising a source address;
        generate an ACK message corresponding to the SYN-ACK message; and send the ACK message to the interface for transmission to the source address
        wherein the processor is further configured to access a TCP stack storing records of transmitted SYN messages and to reconstruct the TCP handshake as if the device had sent the corresponding SYN message by patching the TCP stack as if the device had sent the corresponding SYN message and by creating a record corresponding to the corresponding SYN message.

2. The device of claim 1, wherein each record comprises a sequence number of the SYN message and wherein the processor is further configured to obtain the sequence number for the corresponding SYN message by subtracting one from a corresponding integer in the SYN-ACK message.

3. The device of claim 1, further comprising a firewall configured to intercept the SYN-ACK message and inform the processor of the interception, wherein the processor is further configured to generate the corresponding SYN message that is sent towards the source address and to update the TCP stack, and wherein the firewall is further configured to intercept the corresponding SYN message generated by the processor and only then forward the SYN-ACK message to the processor.

4. The device of claim 1, wherein the processor is further configured to:
    send a request for data to a server, the request comprising a first integer;
    receive data from the server; and verify, using the first integer and a second integer received with the SYN-ACK message, that the SYN-ACK message is related to the request.

5. A method for performing a TCP handshake at a device, the method comprising:
receiving, by a processor of the device, a SYN-ACK message for which the device has not sent a corresponding SYN message, the SYN-ACK message comprising a source address;
generating, by the processor, an ACK message corresponding to the SYN-ACK message by accessing a TCP stack storing records of transmitted SYN messages and reconstructing the TCP handshake as if the device had sent the corresponding SYN message by patching the TCP stack as if the device had sent the corresponding SYN message and by creating a record corresponding to the corresponding SYN message; and
sending the ACK message to the source address.

6. The method of claim 5, wherein each record comprises a sequence number of the SYN message and wherein the method further comprises obtaining the sequence number for the corresponding SYN message by subtracting one from a corresponding integer in the SYN-ACK message.

7. The method of claim 5, further comprising:
intercepting, by a firewall of the device, the SYN-ACK message;
informing, by the firewall, the processor of the interception;
generating, by the processor, the corresponding SYN message;
sending, by the processor, the corresponding SYN message towards the source address;
updating, by the processor, the TCP stack;
intercepting, by the firewall, the corresponding SYN message generated by the processor; and
forwarding, by the firewall, the SYN-ACK message to the processor.

8. The method of claim 5, further comprising, at the processor:
sending a request for data to a server, the request comprising a first integer;
receiving data from the server; and
verifying, using the first integer and a second integer received with the SYN-ACK message, that the SYN-ACK message is related to the request.

9. A server comprising: at least one hardware processor configured to:
receive a request for data from a client, the data comprising a first part and a second part, and the request comprising an address of the client;
send the first part to the client; and
send a SYN message of a TCP handshake to a further device configured to provide the second part to the client, the SYN message comprising the address of the client as source address; and
at least one communications interface configured to communicate messages with other devices to and from the processor.

10. The server of claim 9, wherein the request comprises an integer and wherein the at least one hardware processor is further configured to send the integer to the further device with the SYN message.

11. A method comprising at a processor of a server:
receiving a request for data from a client, the data comprising a first part and a second part, and the request comprising an address of the client;
sending the first part to the client; and
sending a SYN message of a TCP handshake to a further device configured to provide the second part to the client, the SYN message comprising the address of the client as source address.

12. The method of claim 11, wherein the request comprises an integer and wherein the method further comprises sending the integer to the further device with the SYN message.

13. A non-transitory computer-readable storage medium comprising computer-executable instructions to enable a processor of a device to perform a method comprising:
receiving, by a processor of the device, a SYN-ACK message for which the device has not sent a corresponding SYN message, the SYN-ACK message comprising a source address;
generating, by the processor, an ACK message corresponding to the SYN-ACK message by accessing a TCP stack storing records of transmitted SYN messages and reconstructing the TCP handshake as if the device had sent the corresponding SYN message by patching the TCP stack as if the device had sent the corresponding SYN message and by creating a record corresponding to the corresponding SYN message; and
sending the ACK message to the source address.

14. A non-transitory computer-readable storage medium comprising computer-executable instructions to enable a processor of a server to perform a method comprising:
receiving a request for data from a client, the data comprising a first part and a second part, and the request comprising an address of the client;
sending the first part to the client; and
sending a SYN message of a TCP handshake to a further device configured to provide the second part to the client, the SYN message comprising the address of the client as source address.

* * * * *